United States Patent [19]

Kato

[11] Patent Number: 4,633,506

[45] Date of Patent: Dec. 30, 1986

[54] PICTURE IMAGE FILE DEVICE

[75] Inventor: Hiroshi Kato, Kanagawa, Japan

[73] Assignee: Fuji Xerox Co., Ltd., Tokyo, Japan

[21] Appl. No.: 656,900

[22] Filed: Oct. 2, 1984

[30] Foreign Application Priority Data

Oct. 3, 1983 [JP] Japan .................................. 58-184911

[51] Int. Cl.⁴ .............................................. G06K 9/36
[52] U.S. Cl. ...................................... 382/56; 340/799;
358/22; 382/41
[58] Field of Search ............................ 382/56, 57, 41;
340/728, 799, 711, 705; 358/22, 183

[56] References Cited

U.S. PATENT DOCUMENTS

| | | | |
|---|---|---|---|
| 3,772,465 | 11/1973 | Vlahos et al. | 358/22 |
| 4,121,196 | 10/1978 | Johnson et al. | 382/41 |
| 4,164,024 | 8/1979 | Gilbert | 340/705 |
| 4,203,107 | 5/1980 | Lovercheck | 340/799 |
| 4,360,806 | 11/1982 | von Knorre et al. | 340/711 |

Primary Examiner—Leo H. Boudreau
Assistant Examiner—Joseph Mancuso
Attorney, Agent, or Firm—Finnegan, Henderson, Farabow, Garrett & Dunner

[57] ABSTRACT

A picture image file device for storing original documents such as drawings as a picture image file, characterized in that said device is provided with a picture image storing section for storing in a picture image file a predetermined number of picture image units obtained by dividing the picture image file into the predetermined number and a signal processing section in which when another original document, the contents of which have been changed partially from the first-mentioned original document, is inputted, the changed original document is divided into the predetermined number of picture image units and the divisions of the changed original document are compared with the picture image unit so that only the parts of the original document having changed contents are stored as new picture image units in the picture image storing section.

8 Claims, 7 Drawing Figures

PICTURE IMAGE FILE DEVICE

FIELD OF THE INVENTION

The present invention relates to a picture image file device in which a picture image obtained from an original document such as a drawing is stored in the form of a plurality of divisions, and, when a change occurs in the original document, only the changed divisions are stored so as to use the storage space effectively.

BACKGROUND OF THE INVENTION

Conventionally, in a picture image file device an original document, such as a drawing, is read by an optical reading element, such as a CCD, and is stored in a picture image storing section as a picture image file.

In such a picture image file device, the electronic representation of an original document is stored as a picture image file so that a copy of the original document can be obtained by printing out the stored picture image file by using a printer. Also, the original document can be displayed on a display device such as a CRT.

In the conventional picture image file device, however, when a change is made to the original document, the electronic representations of the changed original document are stored in the picture image storing section as a changed picture image file. The picture image file is also stored as it was prior to the change. As a result two complete versions of the document must be stored and the capacity of the picture image storing section to store additional documents is reduced.

OBJECTS AND SUMMARY OF THE INVENTION

It is an object of the present invention to limit the amount of storage necessary for storing and updating documents electronically stored within a picture image file device; and Another object of the present invention is a picture image file device which enables the recreation of the original of a document that has undergone revisions.

These and other objects are attained by a picture image file device comprising an input section for scanning an original document and a corresponding revised document having portions identical with the original document and portions different therefrom, and for generating picture image signals corresponding to the scanned documents; a signal storage section; a signal processing section for receiving the picture image signals corresponding to the original document, for grouping the original document picture image signals into original document subgroup signals corresponding to sections of the original documents and for transferring the original document subgroup signals to the signal storage section for storage therein in a complete document file; and an instruction entering device for entering instructions, the entered instructions including an instruction for controlling the signal processing section to receive the picture image signals corresponding to the revised document, for grouping the revised document picture image signals into revised document subgroup signals corresponding to sections of the revised documents, each of the sections of a revised document corresponding to a different one of the sections of the corresponding original document, for comparing the revised document subgroup signals to the original document subgroup signals for corresponding sections of corresponding original and revised documents, and for replacement storing the revised document subgroup signals for the original document subgroup signals in the complete document file if the compared subgroup signals are not identical.

BRIEF DESCRIPTION OF THE DRAWINGS

These and other objects, features, and advantages of the invention, as well as the invention itself, will become more apparent to those skilled in the art when considered in the light of the accompanying drawings, wherein.

DETAILED DESCRIPTION OF THE PREFERRED EMBODIMENT

Figure 1:
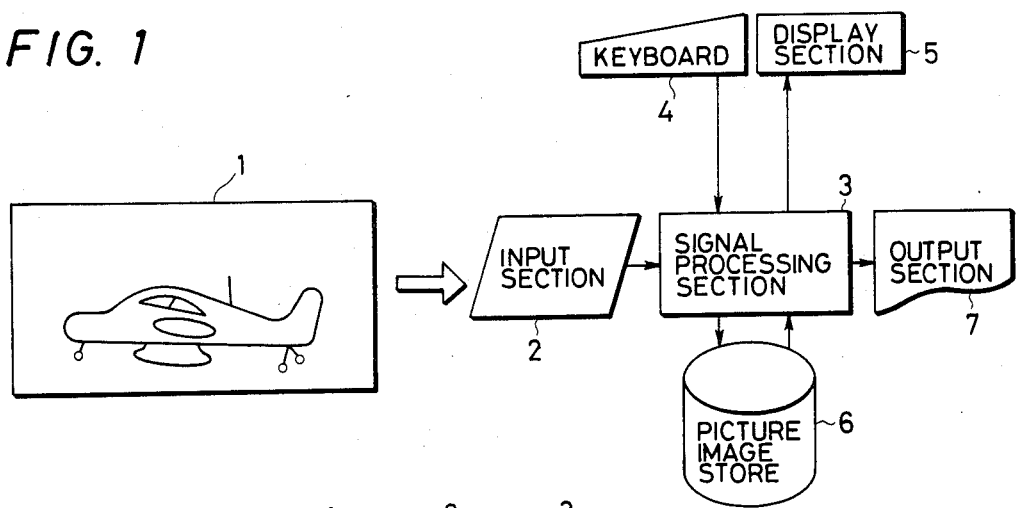
FIG. 1 is a block diagram of the picture image file device of the present invention.

Referring to FIG. 1, an input section 2 includes an optical scanner made up of, for example, CCDs and a photo-electric converter in which the optical scanner scans the contents of an original document 1 and the photo-electric converter which receives the output of the photo-electric converter outputs an electronic, binary-coded digital picture image signal corresponding to the visual pattern on the original document.

A signal processing section 3, which is constructed basically with a microprocessor and memories, divides the picture image represented by the digital picture image signal into a plurality of divisions and performs various signal processing operations, such as decomposition, expansion and compression of binary-coded data. A keyboard 4 for entering various instructions, data, etc., and a display section 5 for displaying a picture image or the like on the basis of the instructions from the keyboard 4 are also provided. A CRT display device, bit map display device or the like, which are capable of graphically displaying the picture images may be employed for the display section 5.

A picture image storing section 6 stores the plurality of divisions of the picture image signal and an output section 7 prints out a picture image on the basis of the result of the signal processing by the signal processing section 3. A laser beam printer, ink jet printer or the like may be employed for the output section 7.

Figure 2A:
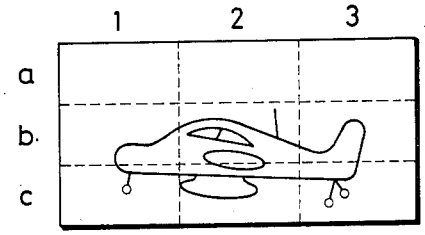
FIGS. 2(a) and 2(b) schematically illustrate the storage of an image of a picture by the device of FIG. 1.
Figure 2B:
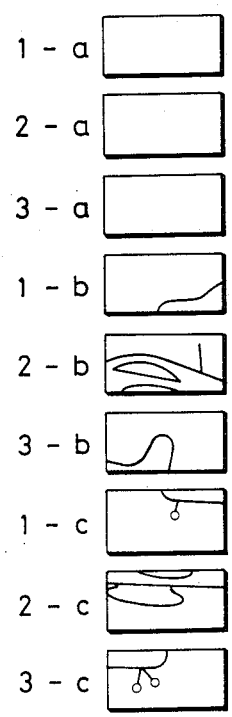

When the original document 1 is scanned by the reading element such as a CCD and outputted in the form of a digital picture image signal from the input section 2, the signal processing section 3 divides the picture image into, for example, nine sections. The sections, 1-a, 2-a, . . . , 3-c, as shown in FIG. 2(a), are stored in a buffer (not shown). The divided nine sections are then stored in respectively assigned storing regions as picture image units 1-a, 2-a, . . ., 3-c, shown in FIG. 2(b), in the picture image storage section 6 to constitute a picture image file.

If an instruction is given through the keyboard 4 to copy the original document 1, the signal processing section 3 reads out the picture image units 1-a, 2-a, . . . , 3-c and combines them into the picture image which is then displayed on the display section 5. When an instruction to print is entered through the keyboard 4 after confirming the coincidence between the contents of the display 5 and the contents of the original document 1, a copy of the original document 1 is printed out by the output section 7.

Figure 3A:
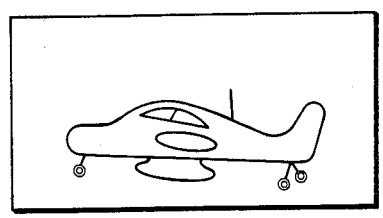
FIGS. 3(a), 3(b), 3(c), and 3(d) schematically illustrate the manner in which an original image stored by the device of FIG. 1 is changed by such device.
Figure 3B:
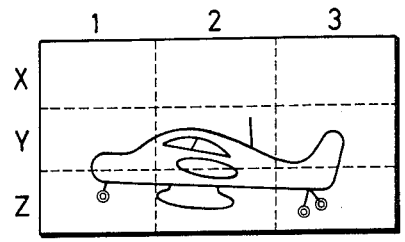
Figure 3C:
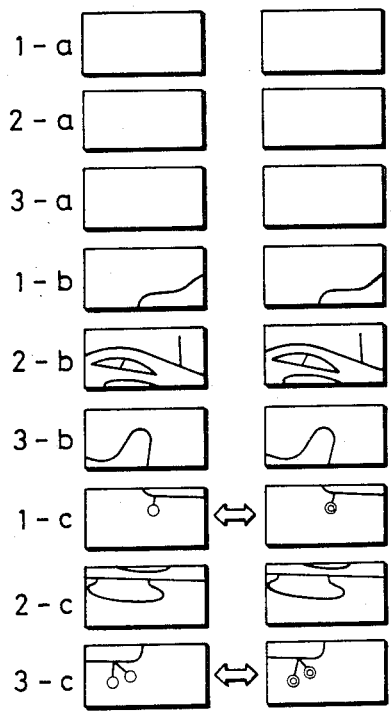
Figure 3D:
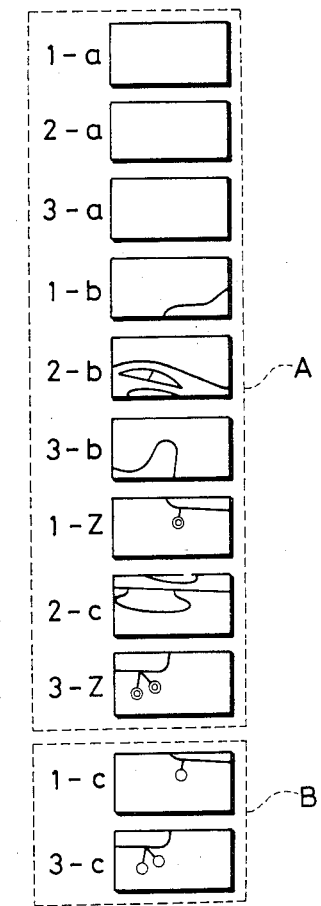

When an original document is to be partially changed, the entire changed or revised document, as shown in FIG. 3(a), is inputted through the input section 2. The processing section 3 divides the revised picture image into nine picture image units or divisions 1-X, 2-X, . . ., 3-Z (FIG. 3 (b)) and compares the divided picture image units 1-X, 2-X, . . . , 3-Z with the picture image units 1-a, 2-a, . . . , 3-c stored in the picture image storing section 6 (FIG. 3(c)). Upon the detection of differences between the picture units 1-Z and 3-Z from the corresponding picture image units 1-c and 3-c, as the result of comparison, the remainder picture image units 1-a, 2-a,. . . , 3-b, and 2-c of the original documents 1 are restored in the initial storing regions of the picture image storing section 6. The picture image units 1-Z and 3-Z of the changed original document 1a are stored in the storing regions in which the picture units 1-c and 3-c of the original document 1 were previously stored. At the same time, the picture units 1-c and 3-c of the original document 1 are stored in new storing regions which are associated with the old storing regions (A and B in FIG. 3(d)).

When an instruction to copy the updated original document 1a is entered through the keyboard 4, a printed picture image can be obtained on the basis of the picture image file A. When an instruction to copy the unchanged original document 1 is entered through the keyboard 4, a printed picture image can be obtained on the basis of the picture image file B.

Although the description has been made in the above-mentioned embodiment as to an original document which is a drawing to be changed frequently, the present invention is not limited to this, and, for example, a facsimile picture image file in which there are many common portions among picture image fields can be treated.

As described above, in the picture image file device according to the present invention, a picture image obtained from an original document such as a drawing is divided into a plurality of divisions which are then stored. When a change is made in the original document, only the changed one or ones of the divisions are stored, so that the picture image storing space can be effectively utilized.

While the salient features of the present invention have been described with reference to the drawings, it should be understood that the described embodiment is susceptible of modification without departing from the spirit and scope of the following claims.

What is claimed is:

1. A picture image file device for updating picture image signals corresponding to a picture in an original document in order to represent a different picture in a revised document, the pictures in said original and revised documents each being organized into a set of divisions corresponding to different physical areas of said documents such that each division of said original document corresponds to a division of said revised document, said picture image file device comprising:

input means for scanning said original document and said revised document and for generating said picture image signals corresponding to both said original and revised documents;

a signal storage section including a complete document file;

signal processing means, coupled to said signal storage section and to said input means, including means for grouping said picture image signals for said original document into subgroup signals each corresponding to a different one of said divisions of said original document, means for causing said signal storage section to store said original document subgroup signals into a complete document file, means for grouping the picture image signals for said revised document into revised document subgroup signals each corresponding to a different one of said divisions of said revised document, means for comparing original document subgroup signals and revised document subgroup signals for corresponding divisions of said documents, and means for causing said signal storage section to store in said complete file any of said revised document subgroup signals which are different from said corresponding original document subgroup signals and to restore in said complete file those of said original document subgroup signals which are not different from said corresponding revised document subgroup signals; and means for entering instructions to control said signal processing means.

2. A picture image file device according to claim 1 wherein said input section includes a scanner comprising charge coupled devices.

3. A picture image file device according to claim 2 wherein said instruction entering device comprises a keyboard coupled to said signal processing section.

4. A picture image file device according to claim 3 further including a printer coupled to said signal processing section for producing a printed copy of a document stored in said complete document file.

5. A picture image file device for updating picture image signals corresponding to a picture in an original document in order to represent a different picture in a revised document, the pictures in said original and revised documents each being subdivided into a set of divisions corresponding to different physical areas of said documents such that each division of said original document corresponds to a division of said revised document, said picture image file device comprising:

input means for scanning said original and said revised documents and for generating picture image signals corresponding to said original and revised documents;

a signal storage section including a complete document file and a replaced divisions file;

signal processing means, coupled to said signal storage section and to said input means, including means for grouping said picture signals for said original document into original document subgroup signals each corresponding to a different one of said divisions of said original document, means for causing said signal storage section to store said original document subgroup signals in a complete document file, means for grouping said picture image signals corresponding to said revised document into revised document subgroup signals each corresponding to a different one of said divisions of said revised documents, means for comparing said original document and said revised document subgroup signals for corresponding divisions, means for replacing in said complete document file said revised document subgroup signals which are different from said corresponding original document subgroup signals, and means for storing in said replaced divisions file said original document subgroup signals which are different from said corresponding revised document subgroup signals.

6. A method for maintaining updated picture image signals for an original document modified according to a revised document, said original and revised documents each being subdivided into divisions corresponding to different physical areas of said documents such that each division of said original document corresponds to a division of said revised document, said method comprising the steps of:

scanning said original document to generate original document picture image signals;

grouping said original document picture image signals into original document subgroup signals each corresponding to a different one of said divisions of said original document;

storing said original document subgroup signals in a complete document file;

scanning said revised document to generate revised document picture image signals;

grouping said revised document picture image signals into revised document subgroup signals each corresponding to a different one of said divisions of said revised documents;

comparing, for each of said corresponding divisions of said original and revised documents, said original document and revised document subgroup signals;

replacing in said complete document file said revised document subgroup signals which are different from the corresponding original document subgroup signals; and restoring in said complete document file said original document subgroup signals which are not different from the corresponding original document subgroup signals.

7. The method of claim 6 further including the step of placing into a replaced divisions file said original document subgroup signals which are different from said revised document subgroup signals.

8. The method of claim 6 further including the step of displaying a picture element from said picture image signals in said complete document file.

* * * * *